United States Patent
Hsu et al.

(10) Patent No.: US 10,929,139 B2
(45) Date of Patent: Feb. 23, 2021

(54) PROVIDING PREDICTIVE INSTRUCTION DISPATCH THROTTLING TO PREVENT RESOURCE OVERFLOWS IN OUT-OF-ORDER PROCESSOR (OOP)-BASED DEVICES

(71) Applicant: QUALCOMM Incorporated, San Diego, CA (US)

(72) Inventors: Lisa Ru-feng Hsu, Durham, NC (US); Vignyan Reddy Kothinti Naresh, Morrisville, NC (US); Gregory Michael Wright, Chapel Hill, NC (US)

(73) Assignee: Qualcomm Incorporated, San Diego, CA (US)

( * ) Notice: Subject to any disclaimer, the term of this patent is extended or adjusted under 35 U.S.C. 154(b) by 152 days.

(21) Appl. No.: 16/143,883

(22) Filed: Sep. 27, 2018

(65) Prior Publication Data

US 2020/0104163 A1 Apr. 2, 2020

(51) Int. Cl.
*G06F 9/38* (2018.01)

(52) U.S. Cl.
CPC .................... *G06F 9/3836* (2013.01)

(58) Field of Classification Search
CPC .................................................... G06F 9/3836
See application file for complete search history.

(56) References Cited

U.S. PATENT DOCUMENTS

| | | |
|---|---|---|
| 5,809,268 A | 9/1998 | Chan |
| 6,542,987 B1 * | 4/2003 | Fischer ................ G06F 7/4824 712/217 |
| 9,542,233 B1 | 1/2017 | Alexander et al. |
| 9,582,284 B2 | 2/2017 | Bell, Jr. et al. |

(Continued)

FOREIGN PATENT DOCUMENTS

| | | |
|---|---|---|
| WO | 2017048641 A1 | 3/2017 |
| WO | 2018111228 A1 | 6/2018 |

OTHER PUBLICATIONS

International Search Report and Written Opinion for PCT/US2019/053320, dated Jan. 8, 2020, 12 pages.

*Primary Examiner* — Jyoti Mehta
(74) *Attorney, Agent, or Firm* — Withrow & Terranova, PLLC

(57) ABSTRACT

Providing predictive instruction dispatch throttling to prevent resource overflow in out-of-order processor (OOP)-based devices is disclosed. An OOP-based device includes a system resource that may be consumed or otherwise occupied by instructions, as well as an execution pipeline comprising a decode stage and a dispatch stage. The OOP further maintains a running count and a resource usage threshold. Upon receiving an instruction block, the decode stage extracts a proxy value that indicates an approximate predicted count of instructions within the instruction block that will consume a system resource. The decode stage then increments the running count by the proxy value. The dispatch stage compares the running count to the resource usage threshold before dispatching any younger instruction blocks. If the running count exceeds the resource usage threshold, the dispatch stage blocks dispatching of younger instruction blocks until the running count no longer exceeds the resource usage threshold.

21 Claims, 13 Drawing Sheets

(56) References Cited

U.S. PATENT DOCUMENTS

| | | | |
|---|---|---|---|
| 2007/0118726 A1* | 5/2007 | Abernathy | G06F 9/3867 |
| | | | 712/225 |
| 2012/0297170 A1 | 11/2012 | Abdallah | |
| 2013/0311999 A1* | 11/2013 | Fetterman | G06F 9/5011 |
| | | | 718/104 |
| 2016/0196156 A1 | 7/2016 | Kuwamura et al. | |
| 2017/0083327 A1* | 3/2017 | Burger | G06F 9/30087 |
| 2017/0139708 A1 | 5/2017 | Lees et al. | |
| 2017/0185542 A1* | 6/2017 | Batley | G06F 12/128 |
| 2017/0371660 A1* | 12/2017 | Smith | G06F 9/3005 |

\* cited by examiner

PROVIDING PREDICTIVE INSTRUCTION DISPATCH THROTTLING TO PREVENT RESOURCE OVERFLOWS IN OUT-OF-ORDER PROCESSOR (OOP)-BASED DEVICES

BACKGROUND

I. Field of the Disclosure

The technology of the disclosure relates generally to out-of-order processor (OOP)-based devices, and, in particular, to avoiding instruction flushes caused by resource overflows in OOP-based devices.

II. Background

Out-of-order processors (OOP) are computer processors that are capable of executing computer program instructions in an order determined by an availability of each instruction's input operands, regardless of the order of appearance of the instructions in the computer program being executed. By dispatching and executing instructions out-of-order, an OOP may be able to fully utilize processor clock cycles that otherwise would go wasted while the OOP waits for data access operations to complete. One implementation of OOP-based devices is based on what is referred to herein as a "block-atomic architecture," in which computer programs are subdivided into instruction blocks that each include multiple instructions that are committed atomically as a group. Load instructions and store instructions within each instruction block may be buffered until execution of the instruction block is complete, at which time all of the load instructions and store instructions are committed together.

Some conventional OOPs also include one or more system resources (e.g., queues or data structures, as non-limiting examples) that may be occupied or otherwise consumed by instructions that are decoded and issued in-order but dispatched out-of-order. Such system resources generally are decoupled from the dispatch stage of the OOP and/or subsequent resource-freeing stages of the OOP, such that there is no mechanism for communicating an occupancy status of the system resource to the relevant stages. As a consequence, the OOP must be designed to handle or avoid "resource overflows" that result from the system resource being fully occupied.

One extreme design approach to reducing the occurrence of resource overflows is to provision the system resource to be so large as to virtually guarantee that it will never be completely occupied. This approach, though, is generally prohibitively expensive in terms of power consumption and physical space within the OOP. Alternatively, the system resource may be provisioned to be adequately sized for most use cases, and the OOP may be configured to stall the processing of instructions if the system resource temporarily becomes fully occupied. However, due to the possibility of out-of-order processing of instructions, the system resource may become fully occupied by younger instructions that block the forward progress of older instructions, thereby causing a deadlock. In such circumstances, the OOP must perform a "resource overflow flush" of the execution pipeline, which negatively impacts overall system performance. Moreover, while it is possible to provide a communications path between the system resource and the dispatch stage of the OOP to provide feedback regarding the occupancy status of the system resource, relevant information for preventing resource overflows may not be available until after instructions have already been dispatched by the dispatch stage. Thus, a mechanism for regulating instruction dispatch in OOP-based devices to prevent resource overflows is desirable.

SUMMARY OF THE DISCLOSURE

Aspects disclosed in the detailed description include providing predictive instruction dispatch throttling to prevent resource overflows in out-of-order processor (OOP-based devices. In this regard, in one aspect, an OOP-based device includes an OOP that provides a system resource that may be consumed or otherwise occupied by instructions. In some aspects, the system resource may comprise an unordered load/store queue (ULSQ) of a load/store unit (LSU) of the OOP. The OOP also provides an execution pipeline that includes a decode stage for receiving and performing in-order decoding of instruction blocks, as well as a dispatch stage for performing out-of-order dispatch of the instruction blocks for execution. The OOP further maintains a running count that indicates an estimated number of pending instructions that will be consuming the system resource, as well as a resource usage threshold that indicates a maximum number of instructions to be dispatched before a potential resource overflow may occur. In exemplary operation, upon receiving an instruction block, the decode stage extracts a proxy value that indicates an approximate predicted count of instructions within the instruction block that will consume a system resource. For example, in aspects in which the system resource is a ULSQ, the proxy value may comprise a maximum load/store identifier (LSD) of the load instructions and/or store instructions within the instruction block, where the value of the LSID may generally correspond to the number of load instructions and/or store instructions within the instruction block. The decode stage then increments the running count by the proxy value. Subsequently, the dispatch stage of the OOP compares the running count to the resource usage threshold before dispatching any younger instruction blocks. If the running count exceeds the resource usage threshold (indicating that a resource overflow may be likely to occur), the dispatch stage blocks dispatching of any younger instruction blocks until the running count no longer exceeds the resource usage threshold. In some aspects, the execution pipeline of the OOP further provides a commit stage configured to decrement the running count by the proxy value of the instruction block upon committing the instruction block. Some aspects may further provide that, if a resource overflow occurs during execution of a looped code segment, the decode stage may dynamically reduce the resource usage threshold, and then restore the previous value of the resource usage threshold once the looped code segment is completed.

In another aspect, an OOP-based device is provided. The OOP-based device comprises an execution pipeline comprising a decode stage and a dispatch stage. The decode stage of the execution pipeline is configured to receive an instruction block and extract a proxy value indicating an approximate predicted count of one or more instructions within the instruction block that will consume a system resource. The decode stage then increments a running count by the proxy value. The dispatch stage of the execution pipeline is configured to, prior to dispatching one or more instruction blocks younger than the instruction block, determine whether the running count exceeds a resource usage threshold. Responsive to determining that the running count exceeds the resource usage threshold, the dispatch stage blocks dispatching of the one or more instruction blocks younger than the instruction block until the running count no longer exceeds the resource usage threshold.

In another aspect, an OOP-based device is provided. The OOP-based device comprises a means for receiving an instruction block and a means for extracting a proxy value indicating an approximate predicted count of one or more instructions within the instruction block that will consume a system resource. The OOP-based device further comprises a means for incrementing a running count by the proxy value. The OOP-based device also comprises a means for, prior to dispatching one or more instruction blocks younger than the instruction block, determining whether the running count exceeds a resource usage threshold. The OOP-based device additionally comprises a means for blocking dispatch of the one or more instruction blocks younger than the instruction block until the running count no longer exceeds the resource usage threshold, responsive to determining that the running count exceeds the resource usage threshold.

In another aspect, a method for providing predictive instruction dispatch throttling in OOP-based devices is provided. The method comprises receiving, by a decode stage of an execution pipeline of the OOP-based device, an instruction block. The method further comprises extracting a proxy value indicating an approximate predicted count of one or more instructions within the instruction block that will consume a system resource. The method also comprises incrementing a running count by the proxy value. The method additionally comprises, prior to dispatching one or more instruction blocks younger than the instruction block, determining, by a dispatch stage of the execution pipeline of the OOP-based device, whether the running count exceeds a resource usage threshold. The method further comprises, responsive to determining that the running count exceeds the resource usage threshold, blocking dispatch of the one or more instruction blocks younger than the instruction block until the running count no longer exceeds the resource usage threshold.

In another aspect, a non-transitory computer-readable medium is provided, having stored thereon computer-executable instructions for causing an OOP of an OOP-based device to receive an instruction block. The computer-executable instructions further cause the OOP to extract a proxy value indicating an approximate predicted count of one or more instructions within the instruction block that will consume a system resource. The computer-executable instructions also cause the OOP to increment a running count by the proxy value. The computer-executable instructions additionally cause the OOP to, prior to dispatching one or more instruction blocks younger than the instruction block, determine whether the running count exceeds a resource usage threshold. The computer-executable instructions further cause the OOP to, responsive to determining that the running count exceeds the resource usage threshold, block dispatching of the one or more instruction blocks younger than the instruction block until the running count no longer exceeds the resource usage threshold.

DETAILED DESCRIPTION

Figure 1:
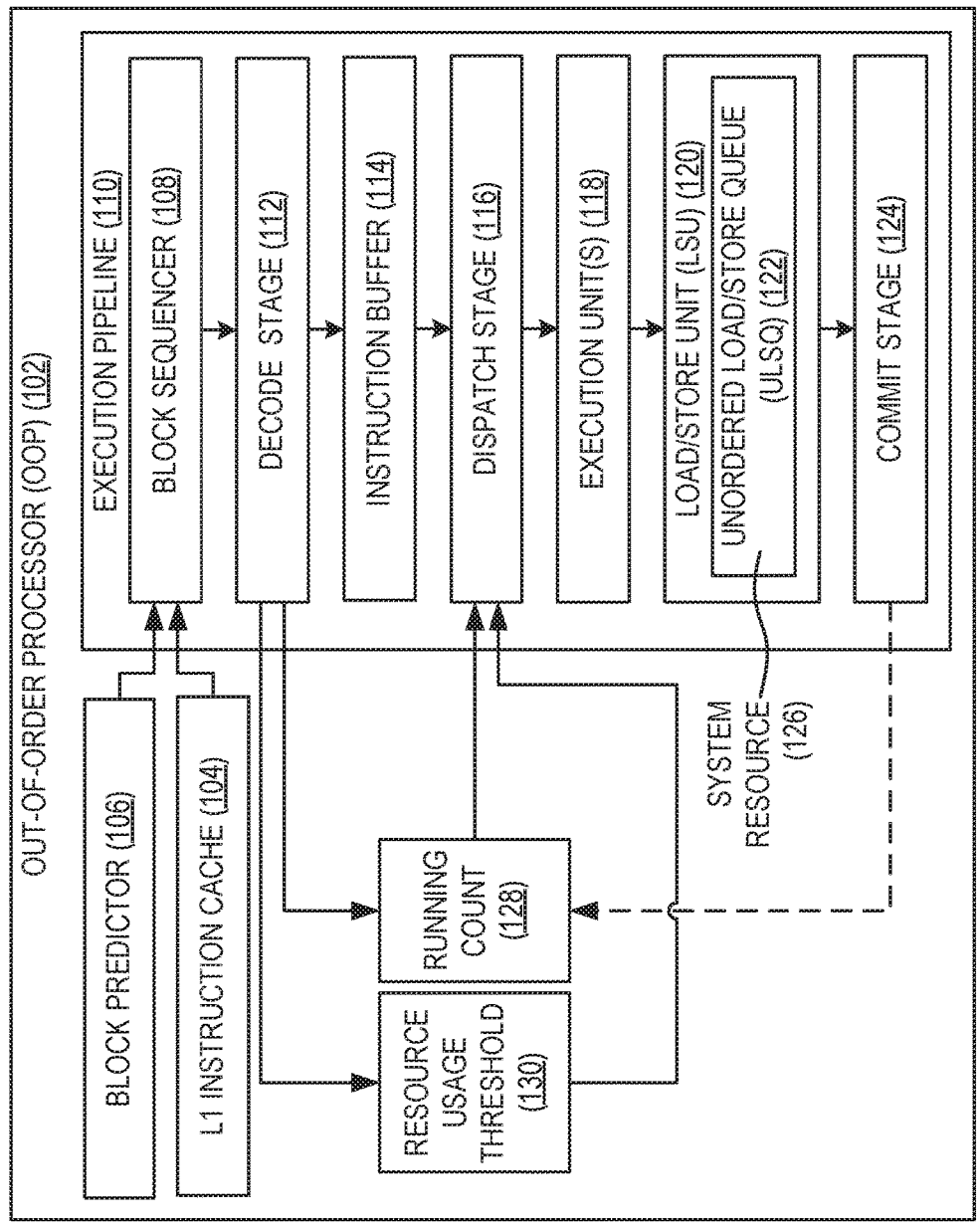
FIG. 1 is a block diagram illustrating an exemplary out-of-order processor (OOP)-based device configured to provide predictive instruction dispatch throttling to prevent resource overflows.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include providing predictive instruction dispatch throttling to prevent resource overflow in out-of-order processor (OOP)-based devices. In this regard, FIG. 1 illustrates an exemplary OOP-based device 100 that includes an OOP 102 that is based on a block-atomic architecture, and that is configured to execute a sequence of instruction blocks (not shown). In some aspects, the OOP 102 may be one of multiple block-atomic processor cores, each executing separate sequences of instruction blocks and/or coordinating to execute a single sequence of instruction blocks. The OOP 102 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages.

In exemplary operation, a Level 1 (L1) instruction cache 104 of the OOP 102 may receive instruction blocks (not shown) that were fetched from a system memory (not shown) for execution. A block predictor 106 determines a predicted execution path of the instruction blocks. In some aspects, the block predictor 106 may predict an execution path in a manner analogous to a branch predictor of a conventional OOP. A block sequencer 108 within an execution pipeline 110 orders the instruction blocks, and forwards the instruction blocks to a decode stage 112 for in-order decoding. It is to be understood that the execution pipeline 110 may include more decode stages 112 than illustrated in FIG. 1.

After decoding, the instruction blocks are held in an instruction buffer 114 pending execution. The instruction buffer 114 in some aspects may comprise one or more reservation stations in which instructions are held until all input operands are available and the instructions are ready for dispatch and execution. A dispatch stage 116 then distributes instructions of the active instruction blocks to one of one or more execution units 118 of the OOP 102. As non-limiting examples, the one or more execution units 118 may comprise an arithmetic logic unit (ALU) and/or a floating-point unit. The one or more execution units 118 may provide results of instruction execution to a load/store unit (LSU) 120 comprising an unordered load/store queue (ULSQ) 122 which, in some aspects, may operate as a hazard detection structure. Instructions that have completed execution are committed by a commit stage 124 of the execution pipeline 110, which updates the architectural state of the OOP 102 based on the results of execution. The commit stage 124 according to some aspects may comprise or otherwise be referred to as a writeback stage, a retire stage, and/or a completion stage, as non-limiting examples.

In the example of FIG. 1, the ULSQ 122 of the LSU 120 is referred to as a system resource 126. Load instructions and store instructions within the instruction blocks executed by the execution pipeline 110 may be stored in entries (not shown) within the ULSQ 122. Entries within the ULSQ 122 that are occupied by load instructions are freed when the load instructions are committed, or when a resource overflow flush of the ULSQ 122 occurs due to all entries of the ULSQ 122 being occupied. Likewise, entries within the ULSQ 122 that are occupied by store instructions are freed at some point after the store instructions are committed, or when a resource overflow flush of the ULSQ 122 occurs.

However, at the time load instructions and/or store instructions are dispatched by the dispatch stage 116 of the execution pipeline 110, the dispatch stage 116 has no knowledge of the occupancy status of the ULSQ 122 because the dispatch stage 116 is decoupled from the allocation and resource freeing processes that manage the contents of the ULSQ 122. Consequently, at an instruction dispatch time, the dispatch stage 116 is unaware of how much space remains within the ULSQ 122, or how much space within the ULSQ 122 will be available by the time newly dispatched load instructions and/or store instructions reach the ULSQ 122. The dispatch stage 116 thus may issue a series of instructions that result in an older instruction encountering a ULSQ 122 that is completely occupied by younger instructions, resulting in a deadlock that must be resolved by a resource overflow flush of the younger instructions within the ULSQ 122 and the execution pipeline 110. This issue may prove especially problematic when executing looped code segments containing load instructions and/or store instructions.

In this regard, the OOP 102 provides a running count 128 and a resource usage threshold 130 that are employed by the decode stage 112 and the dispatch stage 116 of the execution pipeline 110 to prevent resource overflows. As described in greater detail below with respect to FIGS. 2A-2E, the decode stage 112 is configured to receive an instruction block and extract a proxy value that indicates an approximate predicted count of instructions within the instruction block that will consume the system resource 126 (the ULSQ 122, in this example). In the example of FIG. 1, the decode stage 112 may examine the load/store identifiers (LSID) of the load instructions and/or store instructions within the instruction block, and select the LSID with the maximum value as the proxy value. The decode stage 112 then increments the running count 128 by the proxy value. Accordingly, at any given time, the running count 128 represents an approximate maximum count of instructions that are predicted to occupy the ULSQ 122.

Later in the execution pipeline 110, the dispatch stage 116 of the execution pipeline 110 is configured to compare the running count 128 to the resource usage threshold 130. If the running count 128 exceeds the resource usage threshold 130, the dispatch stage 116 blocks dispatching of any younger instruction blocks until the running count 128 no longer exceeds the resource usage threshold 130. In some aspects, the commit stage 124 of the execution pipeline 110 is configured to decrement the running count 128 by the proxy value of an instruction block upon committing the instruction block. Some aspects may further provide that, if a resource overflow occurs during execution of a looped code segment, the decode stage 112 of the execution pipeline 110 may dynamically reduce the resource usage threshold 130, thus reducing the predicted occupancy level of the ULSQ 122 at which instruction dispatch is throttled. The decode stage 112 in such aspects may then restore the previous value of the resource usage threshold 130 once the looped code segment is completed.

To illustrate exemplary operations and communication flows within the OOP-based device 100 of FIG. 1 for predictively throttling instruction dispatch, FIGS. 2A-2E are provided. FIGS. 2A-2E show the decode stage 112, the instruction buffer 114, the dispatch stage 116, the LSU 120, the ULSQ 122 (i.e., the system resource 126 in this example), and the commit stage 124 of the execution pipeline 110 of FIG. 1. FIGS. 2A-2E also show the running count 128 and the resource usage threshold 130 of FIG. 1. In the example of FIGS. 2A-2E, the resource usage threshold 130 is initially set to a value of 15, indicating that dispatching of younger instructions by the dispatch stage 116 should be blocked when more than 15 instructions are predicted to occupy the ULSQ 122. It is to be understood that the value of the resource usage threshold 130 may be programmatically set in some aspects, or may be hardwired in some aspects to a predefined value. As discussed in greater detail below with respect to FIGS. 3A-3D, the resource usage threshold 130 may also be dynamically modified during instruction execution by the decode stage 112 according to some aspects.

Figure 2A:
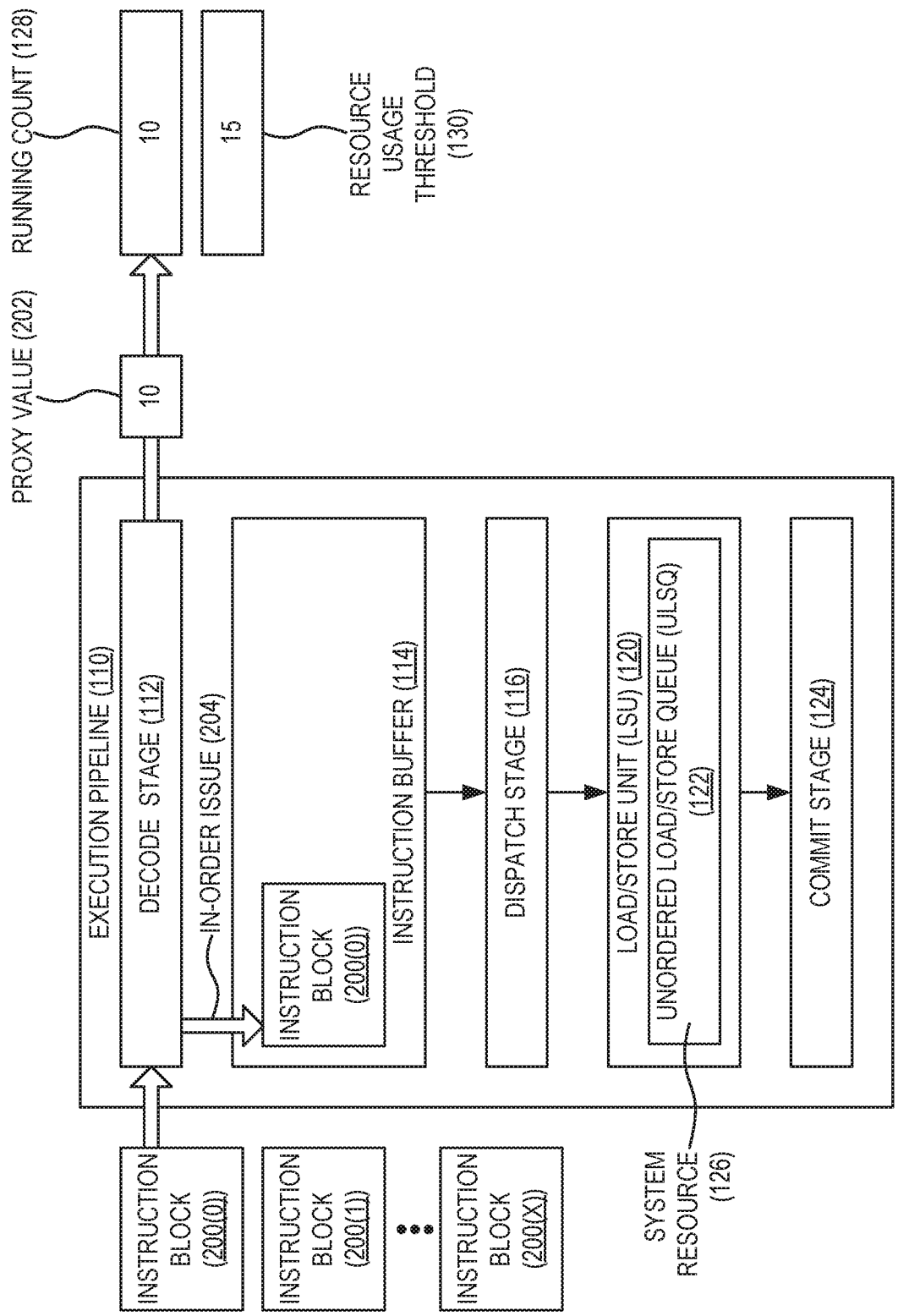
FIGS. 2A-2E are block diagrams illustrating exemplary operations and communication flows within the OOP-based device of FIG. 1 for predictively throttling instruction dispatch.

Referring now to FIG. 2A, a series of instruction blocks 200(0)-200(X) enters the execution pipeline 110 for processing. In FIG. 2A, the decode stage 112 receives the instruction block 200(0) (e.g., from the L1 instruction cache 104 via the block sequencer 108 of FIG. 1). The decode stage 112 extracts a proxy value 202 such as a maximum LSID of the load instructions and/or the store instructions within the instruction block 200(0). The proxy value 202 in the example of FIG. 2A is 10, indicating that approximately 10 load instructions and/or store instructions may reside within the instruction block 200(0). The proxy value 202 is added to the running count 128, resulting in a total of 10. The decode stage 112 then performs an in-order issue 204 of the instruction block 200(0) to the instruction buffer 114, where the instruction block 200(0) awaits dispatching by the dispatch stage 116.

Figure 2B:
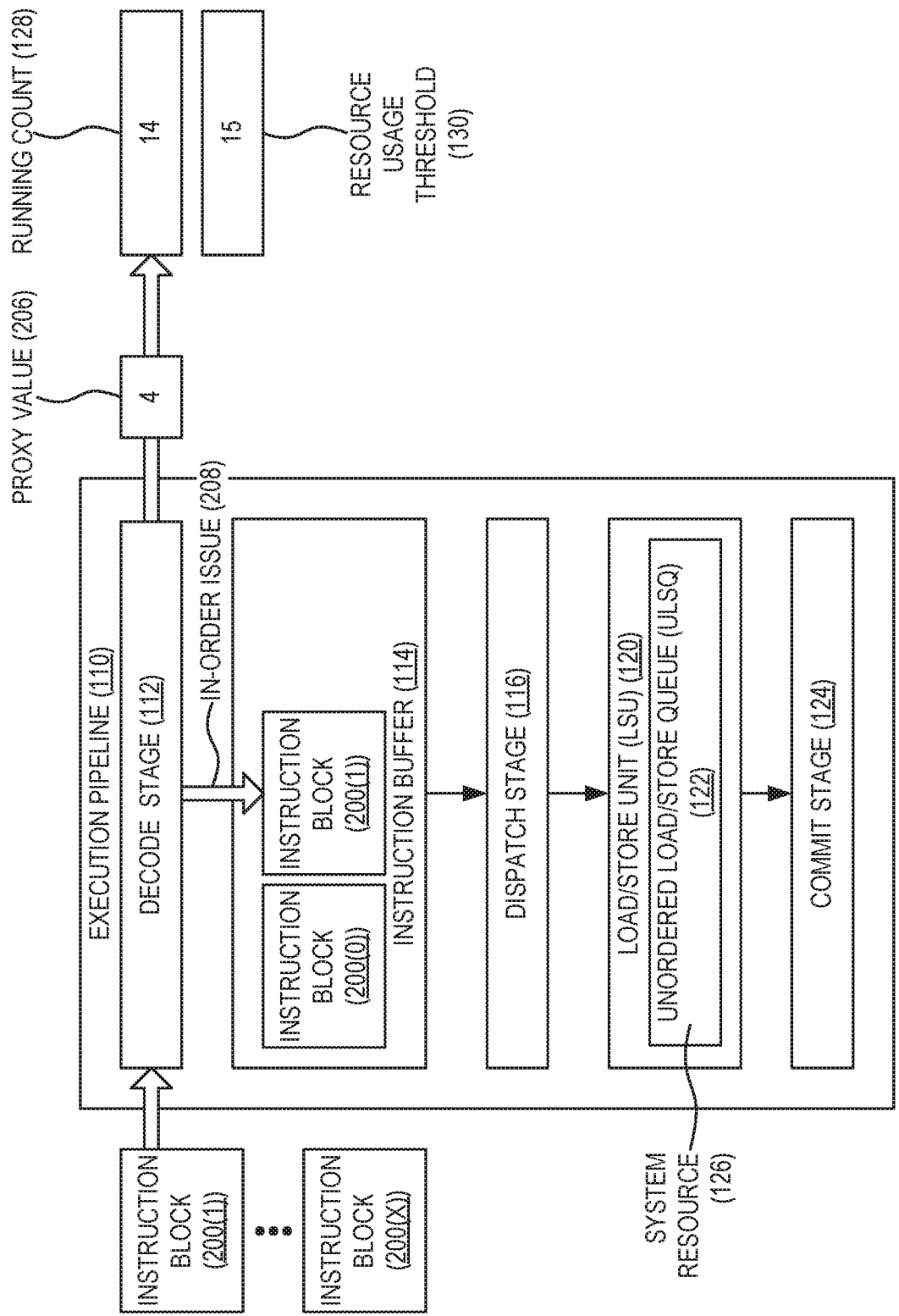

In FIG. 2B, a similar sequence of operations is performed with respect to the instruction block 200(1). After the decode stage 112 receives the instruction block 200(1), the decode stage 112 extracts a proxy value 206 of four (4) from the instruction block 200(1). The proxy value 206 is then added to the running count 128, bringing the running count 128 to a total of 14. The instruction block 200(1) is then sent to the instruction buffer 114 via an in-order issue 208 by the decode stage 112, where it awaits dispatching by the dispatch stage 116.

Figure 2C:
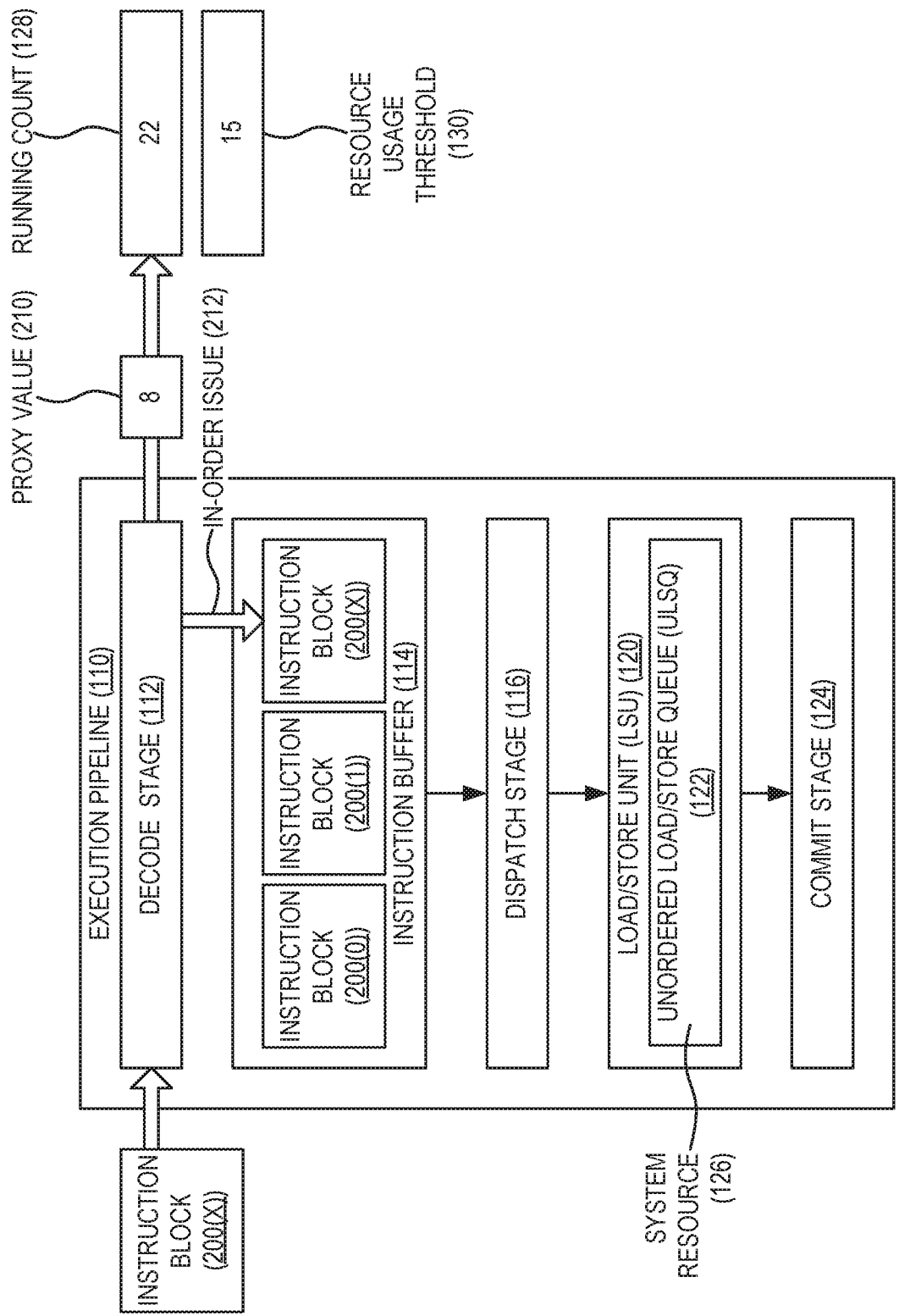

Likewise, in FIG. 2C, the decode stage 112 receives the instruction block 200(X) and extracts a proxy value 210 of eight (8) from the instruction block 200(X) by the decode stage 112. Note that after the proxy value 210 is added to the running count 128, the running count 128 has a value of 22, which is greater than the resource usage threshold 130 of 15.

The decode stage 112 performs an in-order issue 212 of the instruction block 200(X) to the instruction buffer 114, where the instruction block 200(X) awaits dispatching by the dispatch stage 116.

Figure 2D:
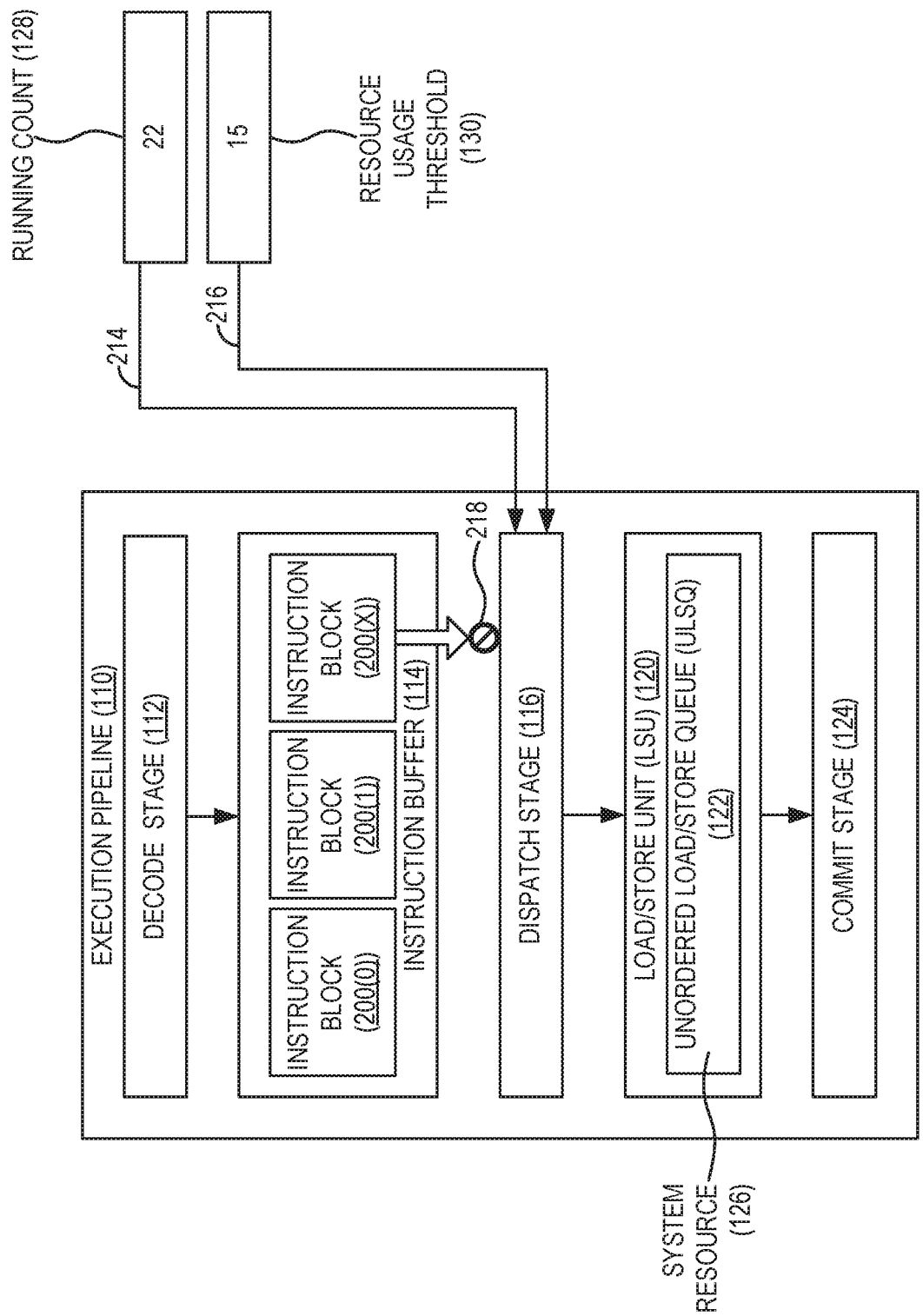

Referring now to FIG. 2D, the dispatch stage 116 has determined that the instruction block 200(X) (i.e., the youngest of the instruction blocks 200(0)-200(X)) is ready to be dispatched. Before dispatching the instruction block 200(X), though, the dispatch stage 116 first accesses the values of the running count 128 and the resource usage threshold 130, as indicated by arrows 214 and 216, respectively. The dispatch stage 116 compares the running count 128 and the resource usage threshold 130, and determines that the value of the running count 128 (i.e., 22) exceeds the value of the resource usage threshold 130 (i.e., 15). Accordingly, the dispatch stage 116 blocks the dispatching of the instruction block 200(X), as indicated by element 218.

Figure 2E:
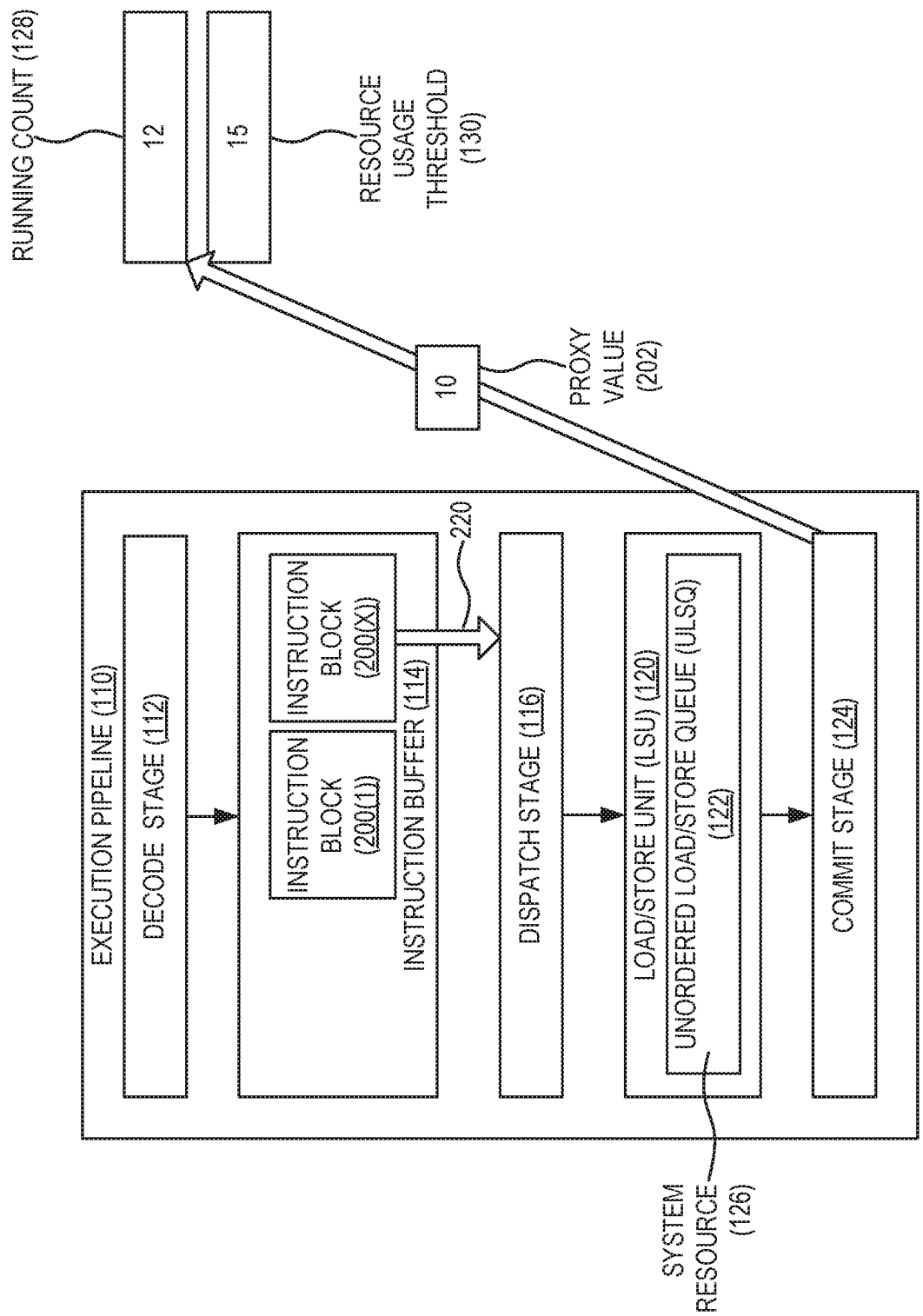

Finally, in FIG. 2E, the oldest instruction block 200(0) (not shown) has been dispatched by the dispatch stage 116 and committed by the commit stage 124. At this point, the commit stage 124 according to some aspects is configured to decrement the running count 128 by the proxy value 202 (i.e., 10) of the instruction block 200(0), bringing the running count 128 down to a value of 12. According to some aspects, the commit stage 124 may independently determine the proxy value 202 of the instruction block 200(0), or may access the proxy value 202 stored by the decode stage 112 using intermediate storage such as a register or other memory (not shown). Once the dispatch stage 116 determines that the value of the running count 128 no longer exceeds the value of the resource usage threshold 130, the dispatch stage 116 is then free to resume out-of-order dispatching of the instruction block 200(X), as indicated by arrow 220.

As noted above, resource overflow flushes may be especially problematic if they occur during execution of looped code segments (i.e., groups of instructions or instruction blocks that are executed repeatedly, usually for a specified number of times or until a specified condition is met). In this regard, FIGS. 3A-3D illustrate exemplary operations and communications flows within some aspects of the execution pipeline 110 of the OOP-based device 100 of FIG. 1 for dynamically modifying the resource usage threshold 130 in response to a resource overflow flush while executing a looped code segment. As with FIGS. 2A-2E, FIGS. 3A-3D show the instruction buffer 114, the dispatch stage 116, the LSU 120, the ULSQ 122 (i.e., the system resource 126 in this example), and the commit stage 124 of the execution pipeline 110, as well as the running count 128 and the resource usage threshold 130. FIGS. 3A-3D further show a decode stage 300 corresponding in functionality to the decode stage 112 of FIG. 1, and further configured to perform the functionality described herein with respect to FIGS. 3A-3D. Additionally, in FIGS. 3A-3D, instruction blocks 302(0)-302(X) together comprise a looped code segment 304, the existence of which may be detected by the decode stage 300.

Figure 3A:
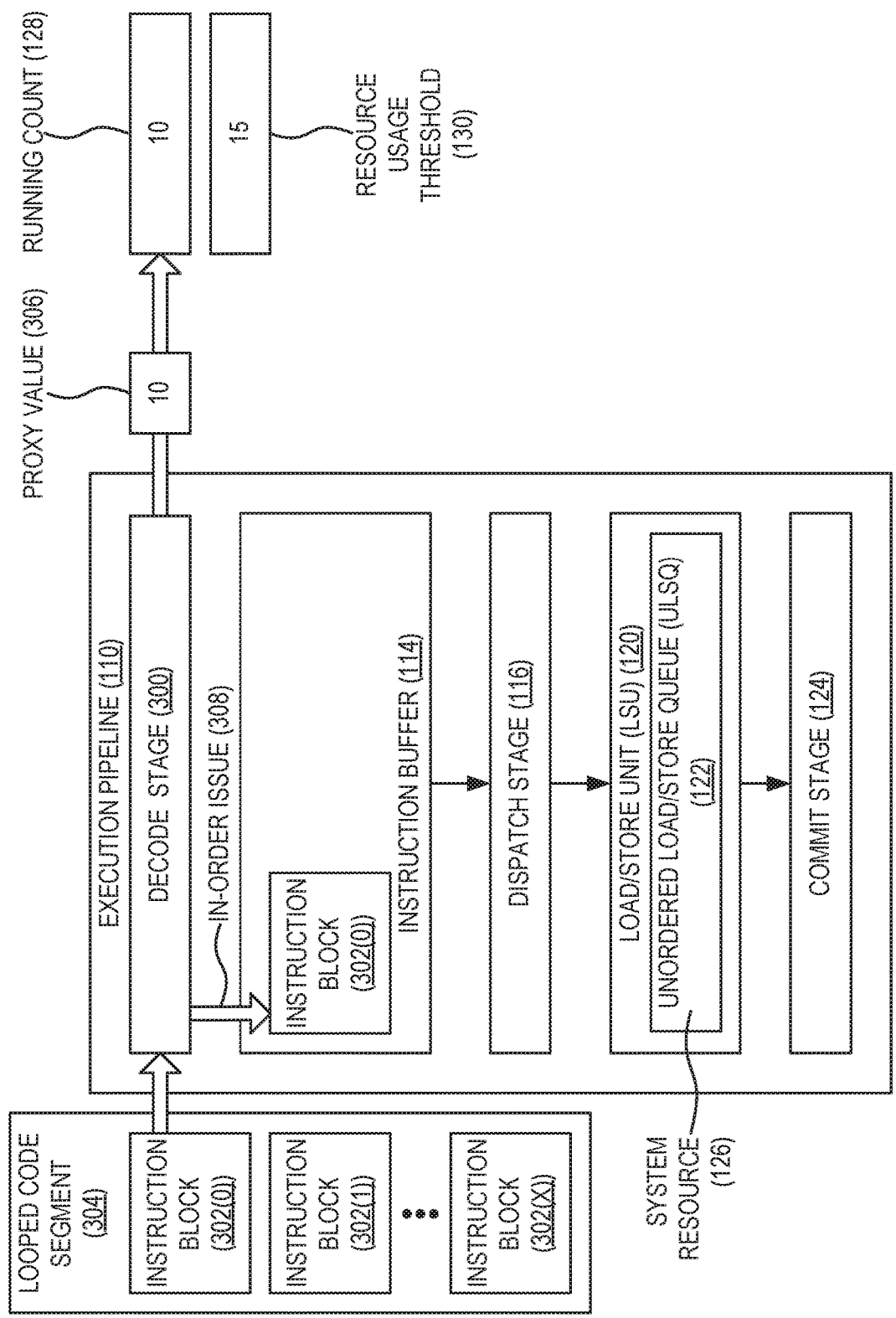
FIGS. 3A-3D are block diagrams illustrating exemplary operations and communications flows within the OOP-based device of FIG. 1 according to some aspects for dynamically modifying a resource usage threshold in response to a resource overflow flush while executing a looped code segment.

In FIG. 3A, a sequence of operations similar to those shown in FIG. 2A takes place. The instruction block 302(0) of the looped code segment 304 is received by the decode stage 300, which extracts a proxy value 306 having a value of 10. The proxy value 306 is added to the running count 128, resulting in a total of 10. The decode stage 300 then performs an in-order issue 308 of the instruction block 302(0) to the instruction buffer 114, where the instruction block 302(0) awaits dispatching by the dispatch stage 116.

Figure 3B:
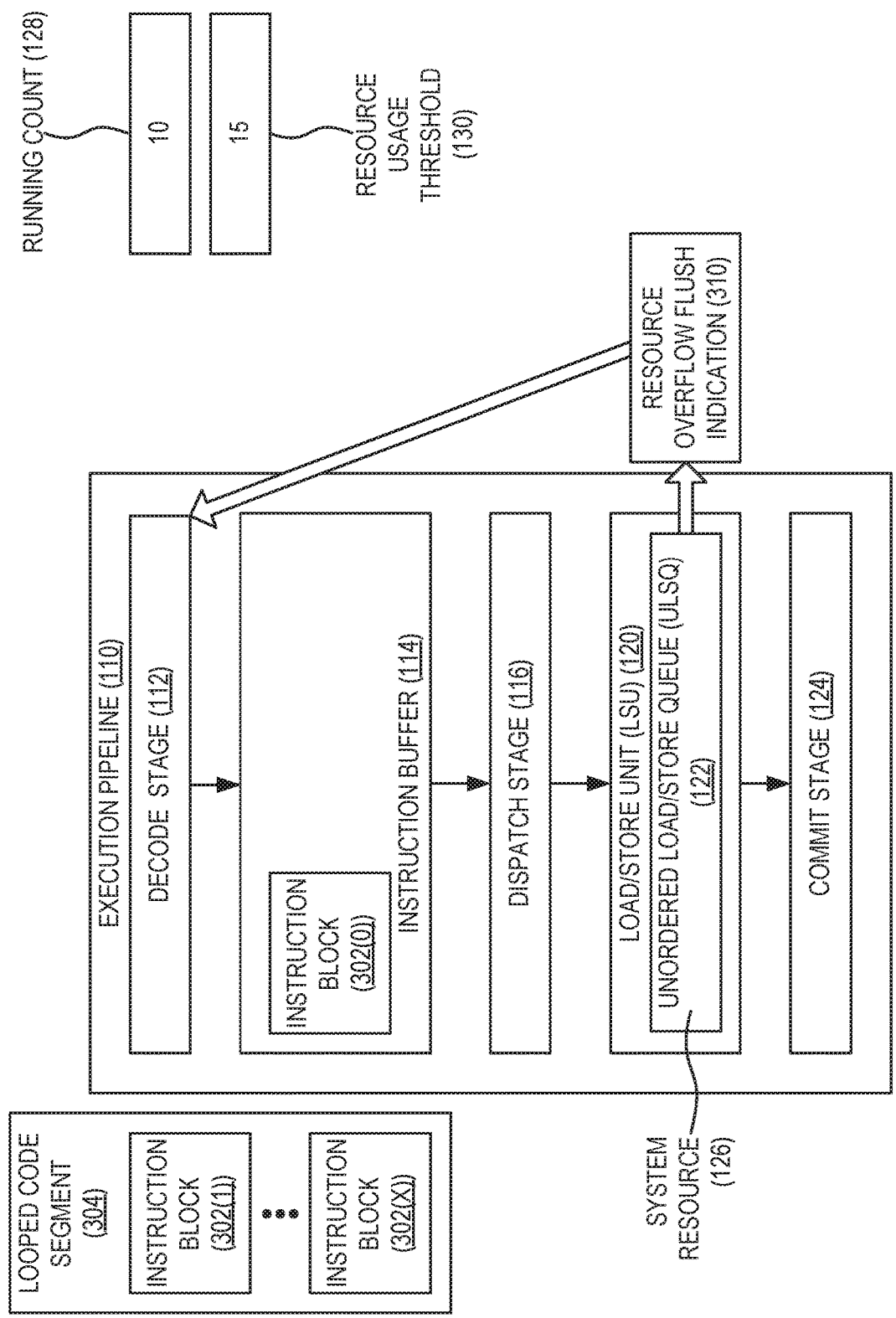
Figure 3C:
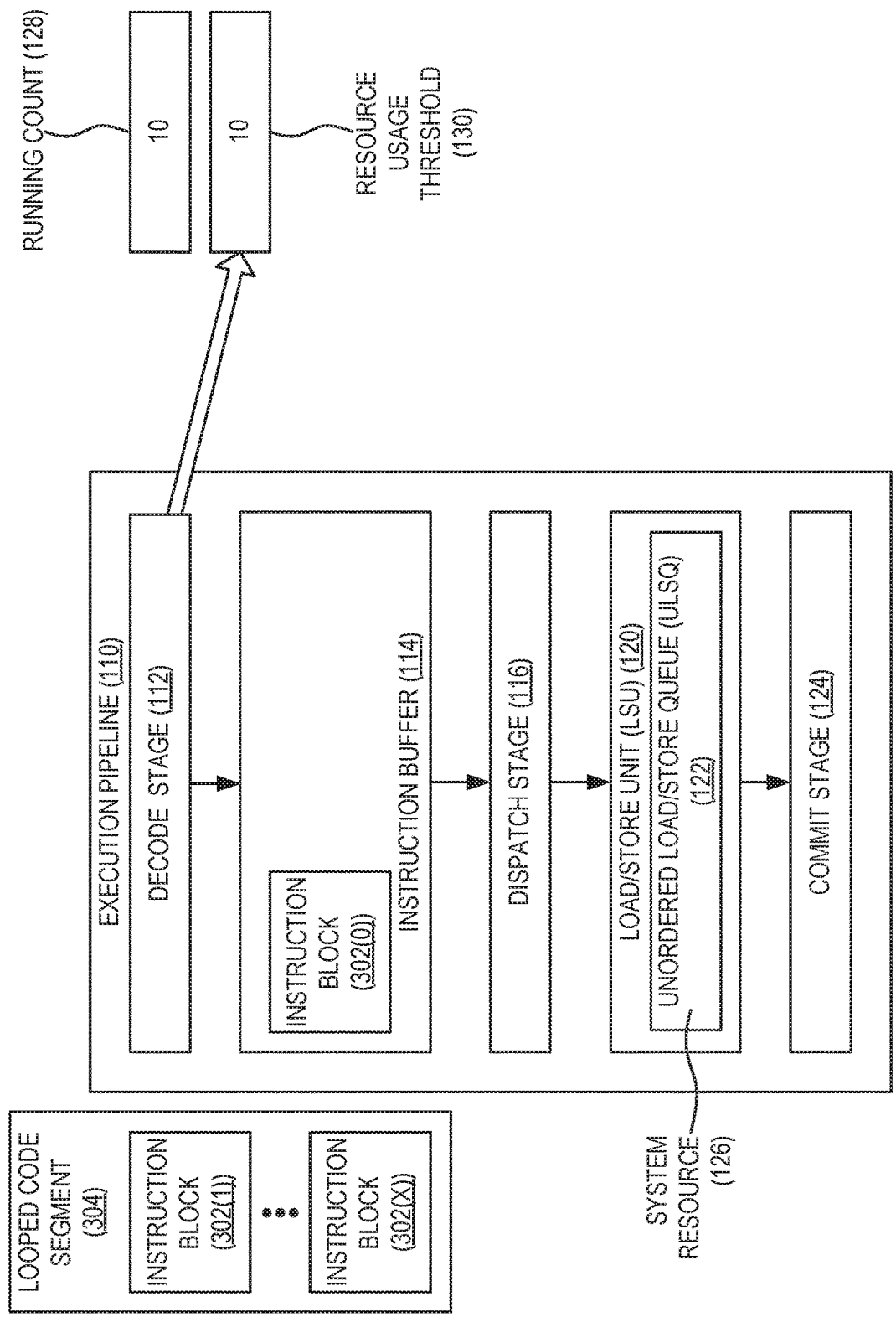
Figure 3D:
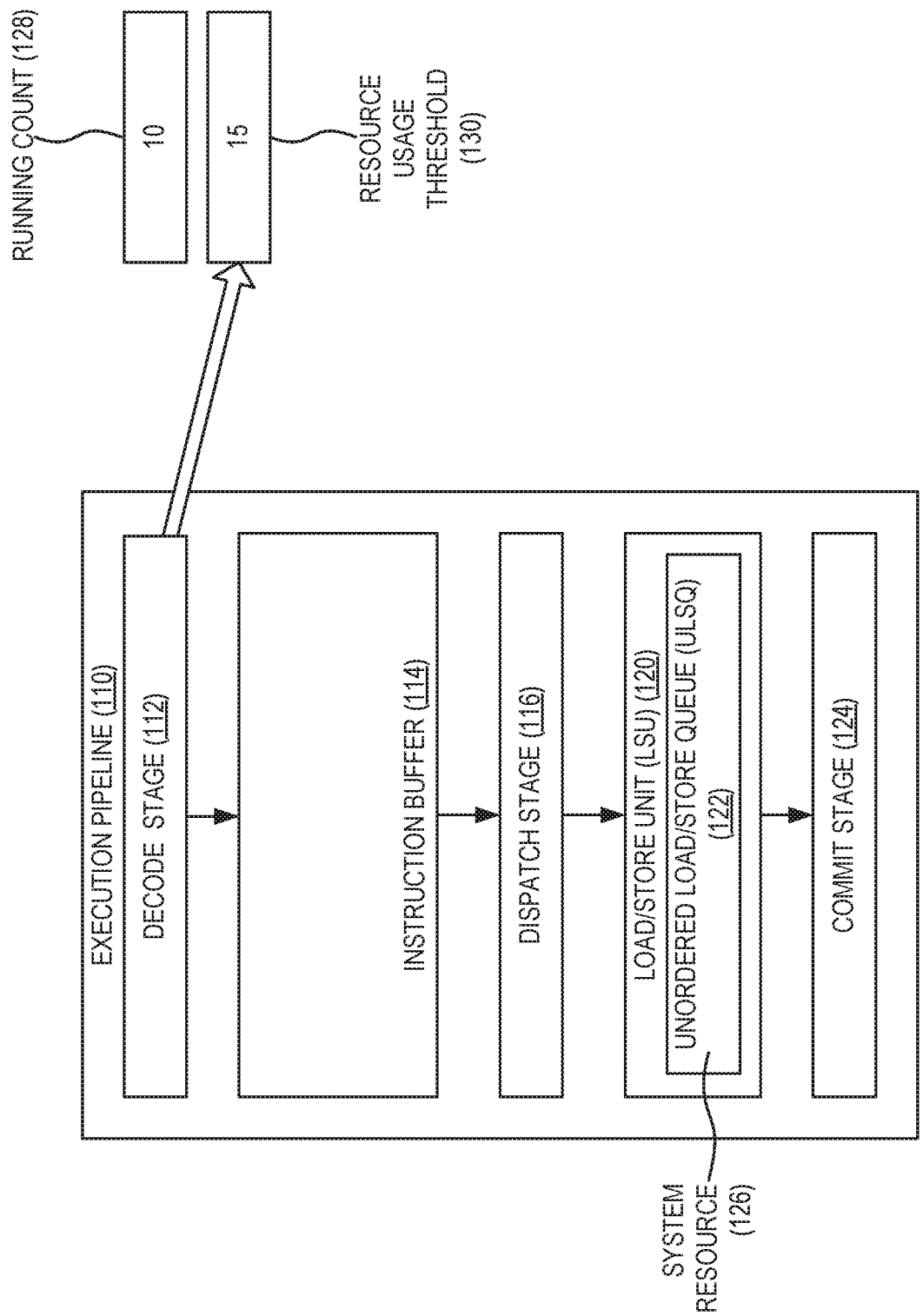

Referring now to FIG. 3B, before the instruction block 302(1) is received by the decode stage 300, a resource overflow occurs in the ULSQ 122. This triggers a resource overflow flush indication 310, which is detected by the decode stage 300. As seen in FIG. 3C, the decode stage 300 responds by reducing the value of the resource usage threshold 130 from its previous value of 15 to a reduced value of 10. Processing of the instruction blocks 302(0)-302(X) then proceeds as illustrated in FIGS. 2B-2E, but with the newly reduced resource usage threshold 130. It is to be understood that the amount by which the resource usage threshold 130 is reduced may vary from that illustrated in FIG. 3C, and further that the resource usage threshold 130 may be reduced more than once during execution of the looped code segment 304. Finally, with reference to FIG. 3I), the decode stage 300 restores the resource usage threshold 130 to its previous value of 15 upon exiting the looped code segment 304.

Figure 4:
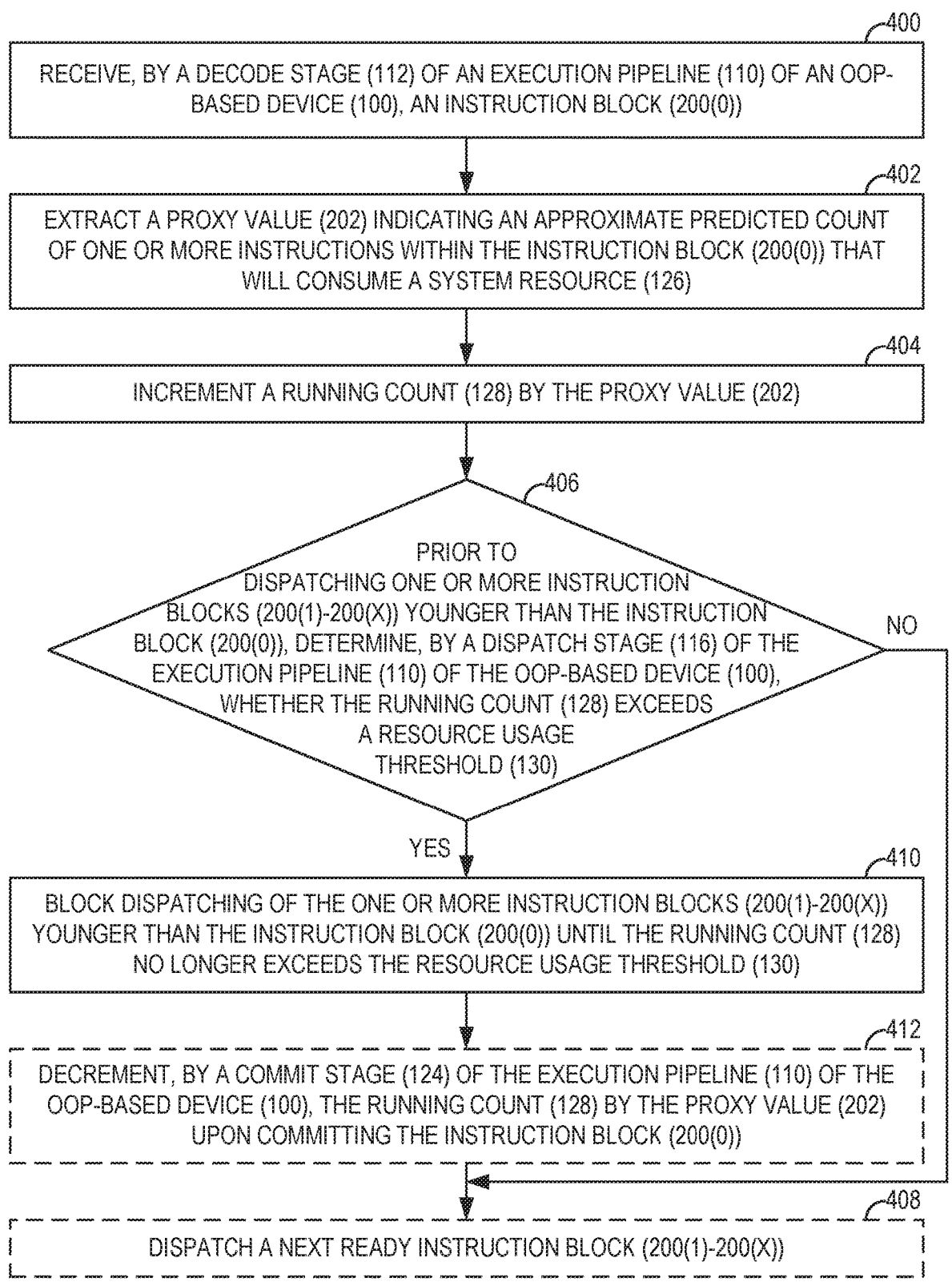
FIG. 4 is a flowchart illustrating exemplary operations performed by the OOP-based device of FIG. 1 for providing predictive instruction dispatch throttling to prevent resource overflow.

To illustrate exemplary operations performed by the OOP-based device 100 of FIG. 1 for providing predictive instruction dispatch throttling to prevent resource overflow, FIG. 4 is provided. Elements of FIGS. 1 and 2A-2E are referenced in describing FIG. 4 for the sake of clarity. Operations in FIG. 4 begin with the decode stage 112 of the execution pipeline 110 of the OOP-based device 100 receiving the instruction block 200(0) (block 400). In this regard, the decode stage 112 may be referred to herein as "a means for receiving an instruction block." The decode stage 112 next extracts the proxy value 202 indicating an approximate predicted count of one or more instructions within the instruction block 200(0) that will consume a system resource 126 (such as the ULSQ 122 of FIG. 1, as a non-limiting example) (block 402). Accordingly, the decode stage 112 may be referred to herein as "a means for extracting a proxy value indicating an approximate predicted count of one or more instructions within the instruction block that will consume a system resource." The decode stage 112 then increments the running count 128 by the proxy value 202 (block 404). The decode stage 112 thus may be referred to herein as "a means for incrementing a running count by the proxy value."

Prior to dispatching the one or more instruction blocks 200(1)-200(X) younger than the instruction block 200(0), the dispatch stage 116 of the execution pipeline 110 of the OOP-based device 100 determines whether the running count 128 exceeds the resource usage threshold 130 (block 406). In this regard, the dispatch stage 116 may be referred to herein as "a means for, prior to dispatching one or more instruction blocks younger than the instruction block, determining whether the running count exceeds a resource usage threshold." If the running count 128 does not exceed the resource usage threshold 130, processing resumes at block 408. However, if the dispatch stage 116 determines at decision block 406 that the running count 128 exceeds the resource usage threshold 130, the dispatch stage 116 blocks dispatch of the one or more instruction blocks 200(1)-200(X) younger than the instruction block 200(0) until the running count 128 no longer exceeds the resource usage threshold 130 (block 410). Accordingly, the dispatch stage 116 may be referred to herein as "a means for blocking dispatch of the one or more instruction blocks younger than the instruction block until the running count no longer exceeds the resource usage threshold, responsive to determining that the running count exceeds the resource usage threshold."

In some aspects, the commit stage 124 of the execution pipeline 110 of the OOP-based device 100 subsequently decrements the running count 128 by the proxy value 202 upon committing the instruction block 200(0) (block 412). The dispatch stage 116 may then dispatch a next ready instruction block 200(1)-200(X) (assuming that the running count 128 no longer exceeds the resource usage threshold 130 after being decremented by the commit stage 124) (block 408).

Figure 5:
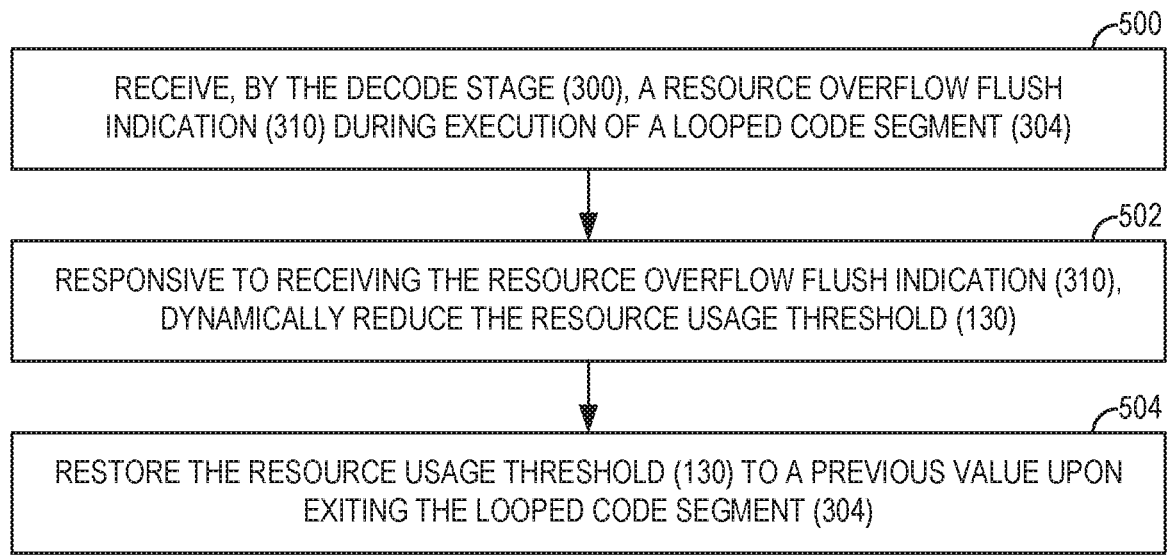
FIG. 5 is a flowchart illustrating exemplary operations performed by the OOP-based device of FIG. 1 in some aspects for dynamically modifying a resource usage threshold in response to a resource overflow flush while executing a looped code segment.

FIG. 5 illustrates exemplary operations performed by the OOP-based device 100 of FIG. 1 in some aspects for dynamically modifying the resource usage threshold 130 in response to a resource overflow flush while executing the looped code segment 304. For the sake of clarity, elements of FIG. 1 and FIGS. 3A-3D are referenced in describing FIG. 5. In FIG. 5, operations begin with the decode stage 300 receiving a resource overflow flush indication 310 during execution of the looped code segment 304 (block 500). In response, the decode stage 300 dynamically reduces the resource usage threshold 130 (block 502). The decode stage 300 subsequently restores the resource usage threshold 130 to a previous value upon exiting the looped code segment 304 (block 504).

Providing predictive instruction dispatch throttling to prevent resource overflow in OOP-based devices according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 6:
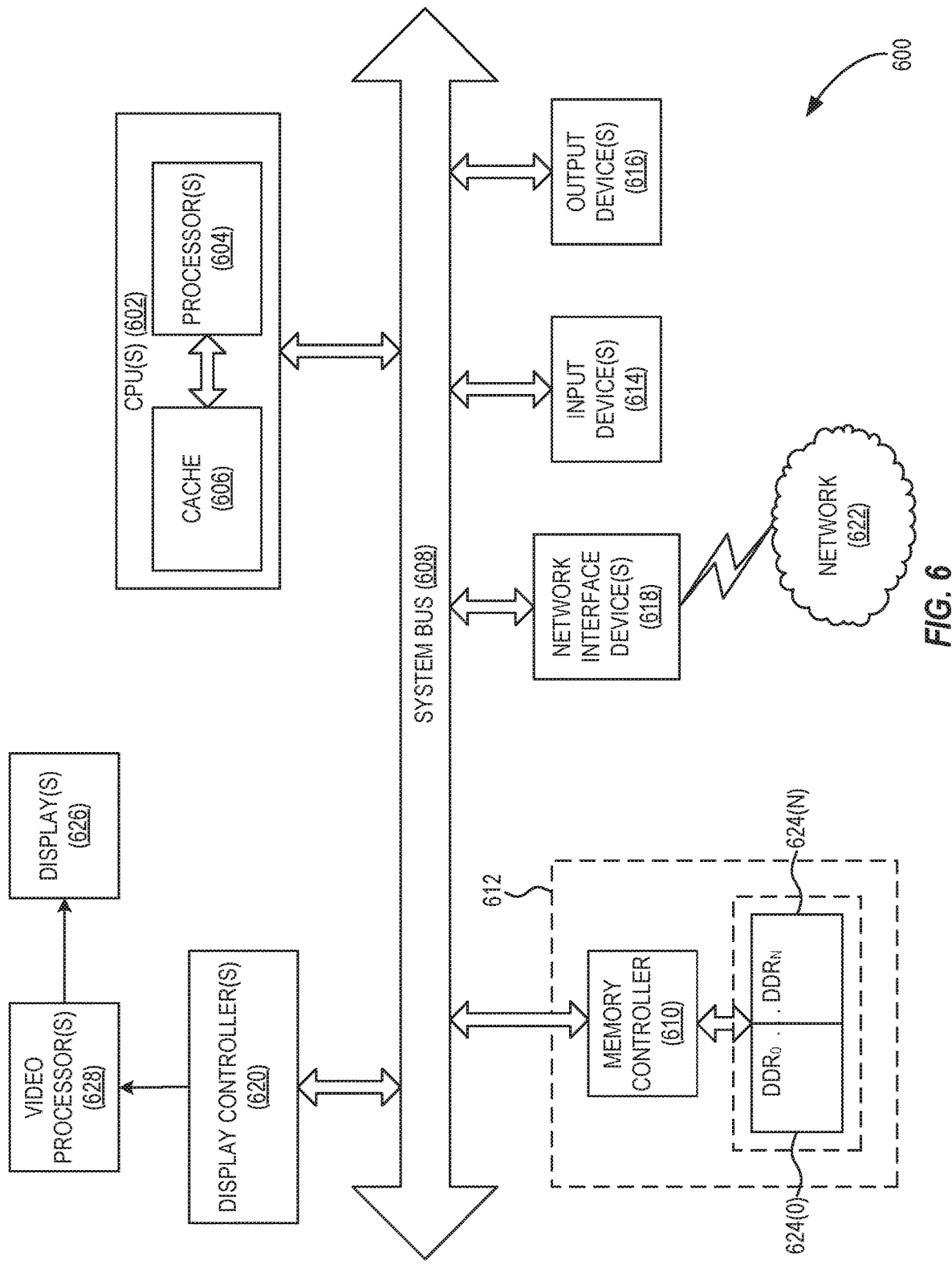
FIG. 6 is a block diagram of an exemplary processor-based system that can include the OOP-based device of FIG. 1.

In this regard, FIG. 6 illustrates an example of a processor-based system 600 that may correspond to the OOP-based device 100 of FIG. 1. The processor-based system 600 includes one or more central processing units (CPUs) 602, each including one or more processors 604 (which in some aspects may correspond to the OOP 102 of FIG. 1). The CPU(s) 602 may have cache memory 606 coupled to the processor(s) 604 for rapid access to temporarily stored data. The CPU(s) 602 is coupled to a system bus 608 and can intercouple master and slave devices included in the processor-based system 600. As is well known, the CPU(s) 602 communicates with these other devices by exchanging address, control, and data information over the system bus 608. For example, the CPU(s) 602 can communicate bus transaction requests to a memory controller 610 as an example of a slave device.

Other master and slave devices can be connected to the system bus 608. As illustrated in FIG. 6, these devices can include a memory system 612, one or more input devices 614, one or more output devices 616, one or more network interface devices 618, and one or more display controllers 620, as examples. The input device(s) 614 can include any type of input device, including but not limited to input keys, switches, voice processors, etc. The output device(s) 616 can include any type of output device, including, but not limited to, audio, video, other visual indicators, etc. The network interface device(s) 618 can be any devices configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include one or more memory units 624(0)-624(N).

The CPU(s) 602 may also be configured to access the display controller(s) 620 over the system bus 608 to control information sent to one or more displays 626. The display controller(s) 620 sends information to the display(s) 626 to be displayed via one or more video processors 628, which process the information to be displayed into a format suitable for the display(s) 626. The display(s) 626 can include any type of display, including, but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An out-of-order processor (OOP)-based device, comprising an execution pipeline comprising a decode stage and a dispatch stage, wherein:
    the decode stage of the execution pipeline is configured to:
        receive an instruction block;
        extract a proxy value indicating a predicted count of instructions within the instruction block that will consume a system resource, wherein the predicted count of instructions has a value of at least one (1); and
        increment a running count by the proxy value; and
    the dispatch stage of the execution pipeline is configured to:
        prior to dispatching one or more instruction blocks younger than the instruction block, determine whether the running count exceeds a resource usage threshold; and
        responsive to determining that the running count exceeds the resource usage threshold, block dispatching of the one or more instruction blocks younger than the instruction block until the running count no longer exceeds the resource usage threshold.

2. The OOP-based device of claim 1, wherein the execution pipeline further comprises a commit stage configured to decrement the running count by the proxy value upon committing the instruction block.

3. The OOP-based device of claim 1, wherein the proxy value comprises a maximum value of one or more load/store identifiers (LSIDs) of a corresponding one or more load instructions or store instructions within the instruction block.

4. The OOP-based device of claim 1, wherein the system resource comprises an unordered load/store queue (ULSQ) of a load/store unit (LSU) of the OOP-based device.

5. The OOP-based device of claim 1, wherein the decode stage of the execution pipeline is further configured to:
    receive a resource overflow flush indication during execution of a looped code segment; and
    responsive to receiving the resource overflow flush indication, dynamically reduce the resource usage threshold.

6. The OOP-based device of claim 5, wherein the decode stage of the execution pipeline is further configured to restore the resource usage threshold to a previous value upon exiting the looped code segment.

7. The OOP-based device of claim 1 integrated into an integrated circuit (IC).

8. The OOP-based device of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

9. An out-of-order processor (OOP)-based device, comprising:
    means for:
        receiving an instruction block;
        extracting a proxy value indicating a predicted count of instructions within the instruction block that will consume a system resource, wherein the predicted count of instructions has a value of at least one (1); and
        incrementing a running count by the proxy value; and
    means for:
        prior to dispatching one or more instruction blocks younger than the instruction block, determining whether the running count exceeds a resource usage threshold; and
        blocking dispatching of the one or more instruction blocks younger than the instruction block until the running count no longer exceeds the resource usage threshold, responsive to determining that the running count exceeds the resource usage threshold.

10. A method for providing predictive instruction dispatch throttling in out-of-order processor (OOP)-based devices, comprising:
    receiving, by a decode stage of an execution pipeline of an OOP-based device, an instruction block;
    extracting, by the decode stage, a proxy value indicating a predicted count of instructions within the instruction block that will consume a system resource, wherein the predicted count of instructions has a value of at least one (1);
    incrementing, by the decode stage, a running count by the proxy value;

prior to dispatching one or more instruction blocks younger than the instruction block, determining, by a dispatch stage of the execution pipeline of the OOP-based device, whether the running count exceeds a resource usage threshold; and responsive to determining that the running count exceeds the resource usage threshold, blocking, by the dispatch stage, dispatching of the one or more instruction blocks younger than the instruction block until the running count no longer exceeds the resource usage threshold.

11. The method of claim 10, further comprising decrementing, by a commit stage of the execution pipeline of the OOP-based device, the running count by the proxy value upon committing the instruction block.

12. The method of claim 10, wherein the proxy value comprises a maximum value of one or more load/store identifiers (LSIDs) of a corresponding one or more load instructions or store instructions within the instruction block.

13. The method of claim 10, wherein the system resource comprises an unordered load/store queue (ULSQ) of a load/store unit (LSU) of the OOP-based device.

14. The method of claim 10, further comprising:
receiving, by the decode stage, a resource overflow flush indication during execution of a looped code segment; and
responsive to receiving the resource overflow flush indication, dynamically reducing the resource usage threshold.

15. The method of claim 14, further comprising restoring the resource usage threshold to a previous value upon exiting the looped code segment.

16. A non-transitory computer-readable medium, having stored thereon computer-executable instructions for causing an out-of-order processor (OOP) of an OOP-based device to:
receive, by a decode stage of an execution pipeline of the OOP, an instruction block;
extract, by the decode stage, a proxy value indicating a predicted count of instructions within the instruction block that will consume a system resource, wherein the predicted count of instructions has a value of at least one (1);
increment, by the decode stage, a running count by the proxy value;
prior to dispatching one or more instruction blocks younger than the instruction block, determine, by a dispatch stage of the execution pipeline, whether the running count exceeds a resource usage threshold; and
responsive to determining that the running count exceeds the resource usage threshold, block, by the dispatch stage, dispatching of the one or more instruction blocks younger than the instruction block until the running count no longer exceeds the resource usage threshold.

17. The non-transitory computer-readable medium of claim 16 having stored thereon computer-executable instructions for further causing the OOP to decrement the running count by the proxy value upon committing the instruction block.

18. The non-transitory computer-readable medium of claim 16, wherein the proxy value comprises a maximum value of one or more load/store identifiers (LSIDs) of a corresponding one or more load instructions or store instructions within the instruction block.

19. The non-transitory computer-readable medium of claim 16, wherein the system resource comprises an unordered load/store queue (ULSQ) of a load/store unit (LSU) of the OOP-based device.

20. The non-transitory computer-readable medium of claim 16 having stored thereon computer-executable instructions for further causing the OOP to:
receive a resource overflow flush indication during execution of a looped code segment; and
responsive to receiving the resource overflow flush indication, dynamically reduce the resource usage threshold.

21. The non-transitory computer-readable medium of claim 20 having stored thereon computer-executable instructions for further causing the OOP to restore the resource usage threshold to a previous value upon exiting the looped code segment.

* * * * *